Dec. 1, 1953 E. MULLEN 2,661,053
AUTOMATICALLY ADJUSTING, POWER-OPERATED
TIRE AND RIM ASSEMBLING APPARATUS
Filed March 28, 1951 9 Sheets-Sheet 1
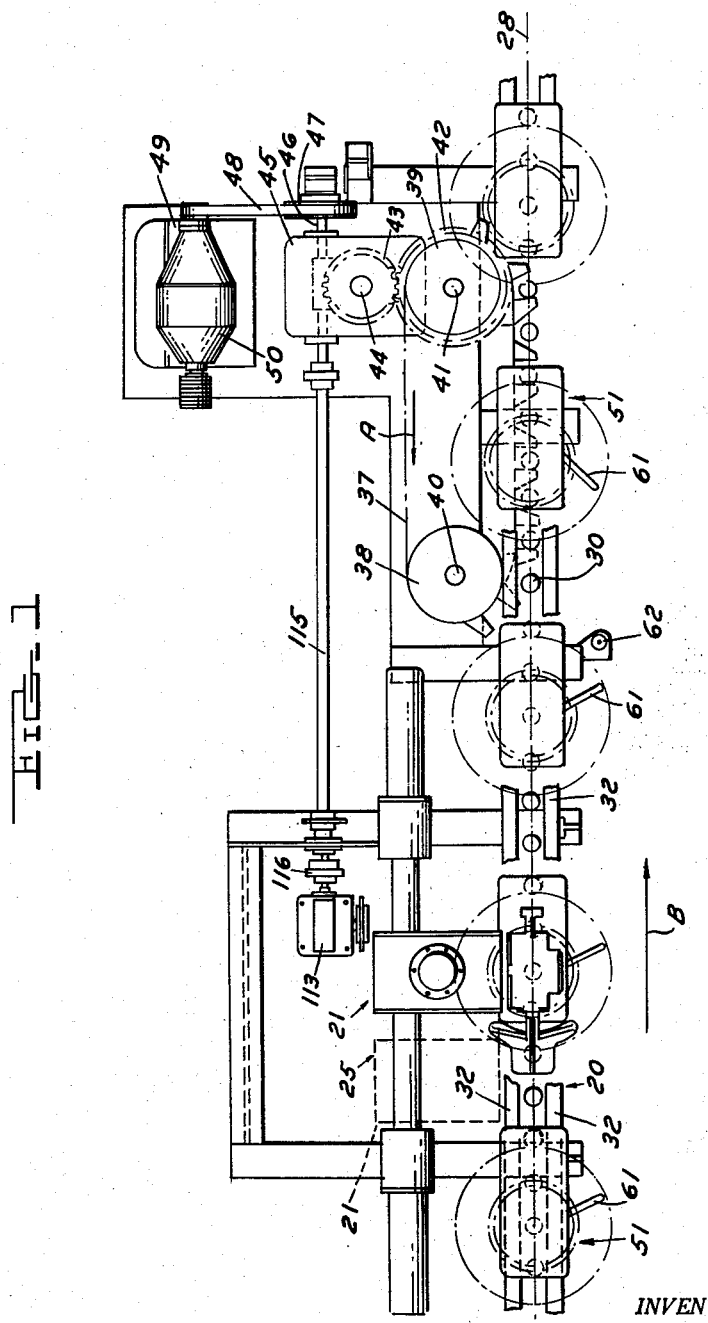
INVENTOR.
EDWARD MULLEN
BY
ATTORNEYS

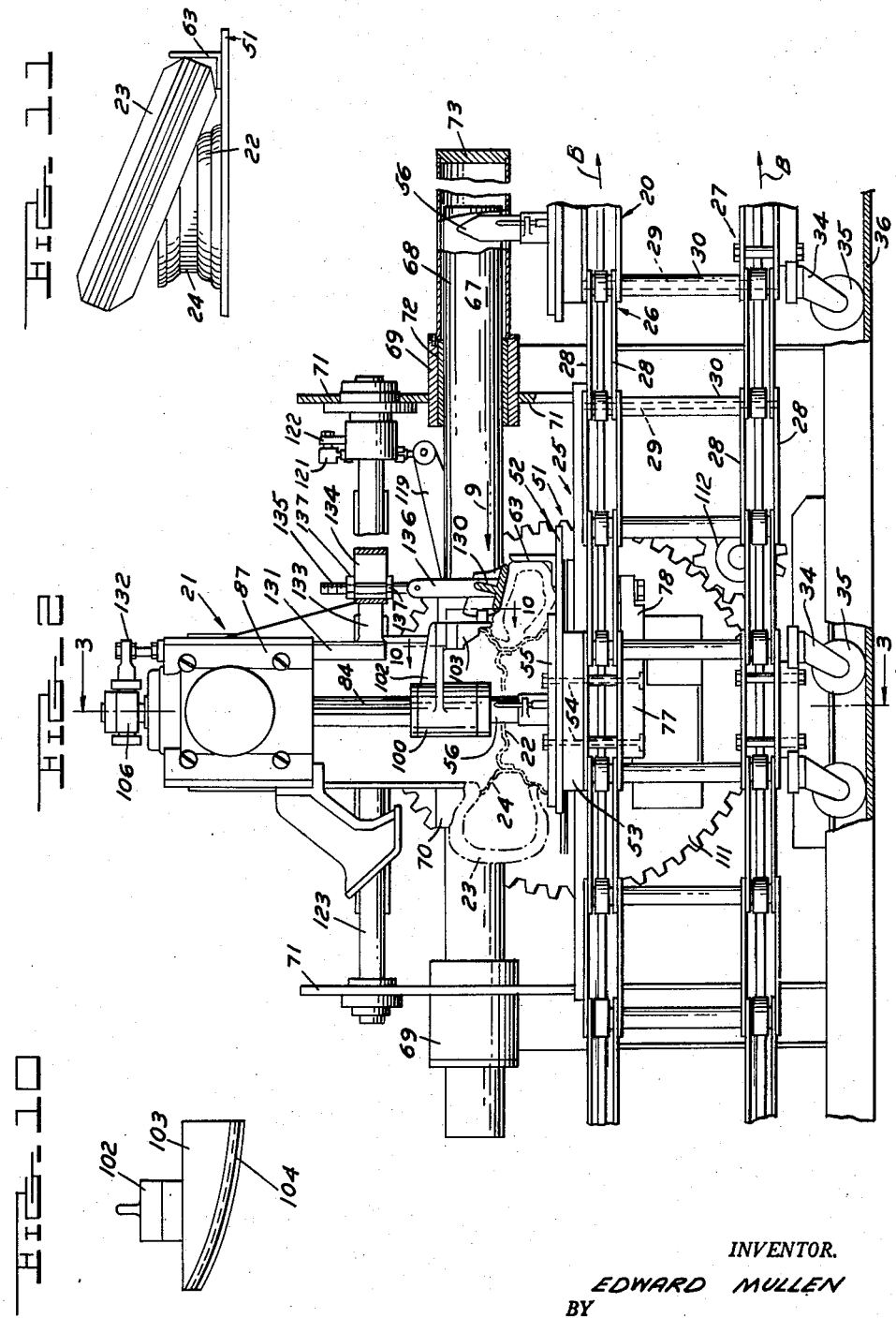

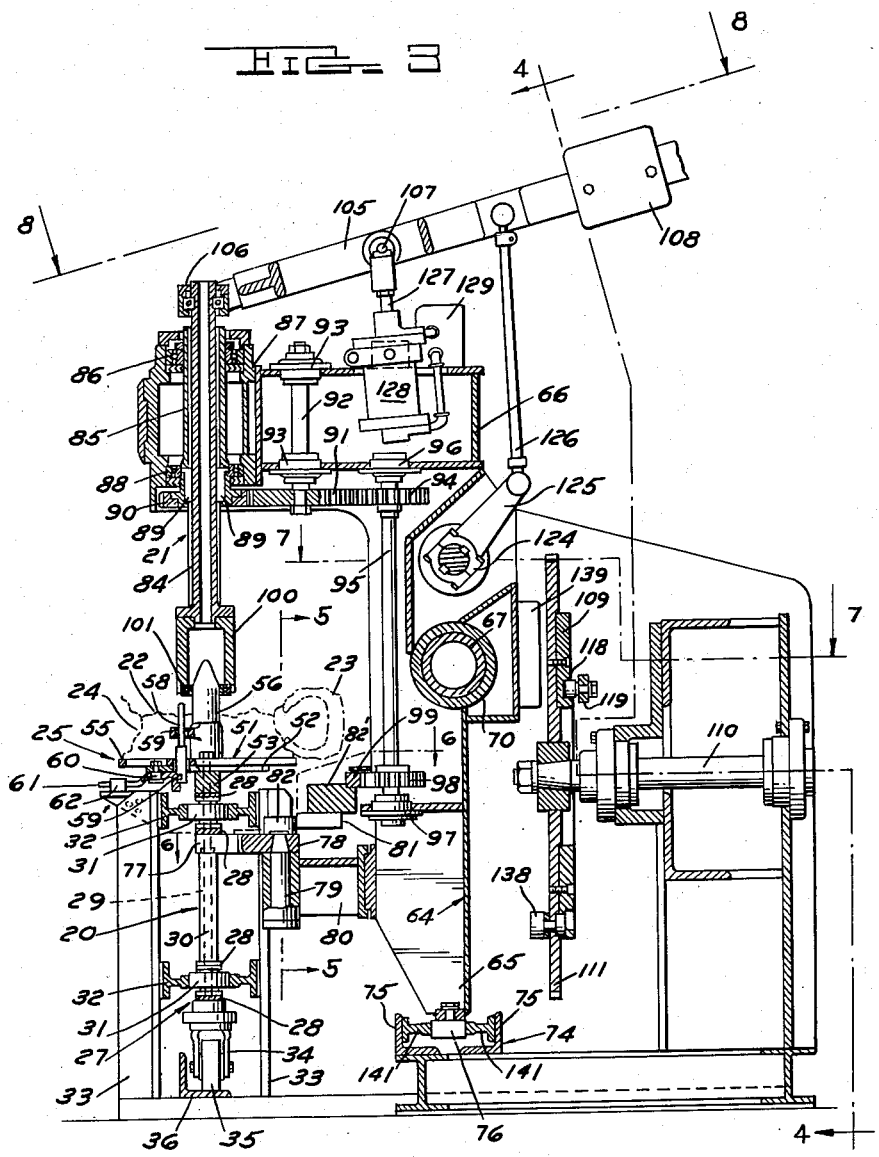

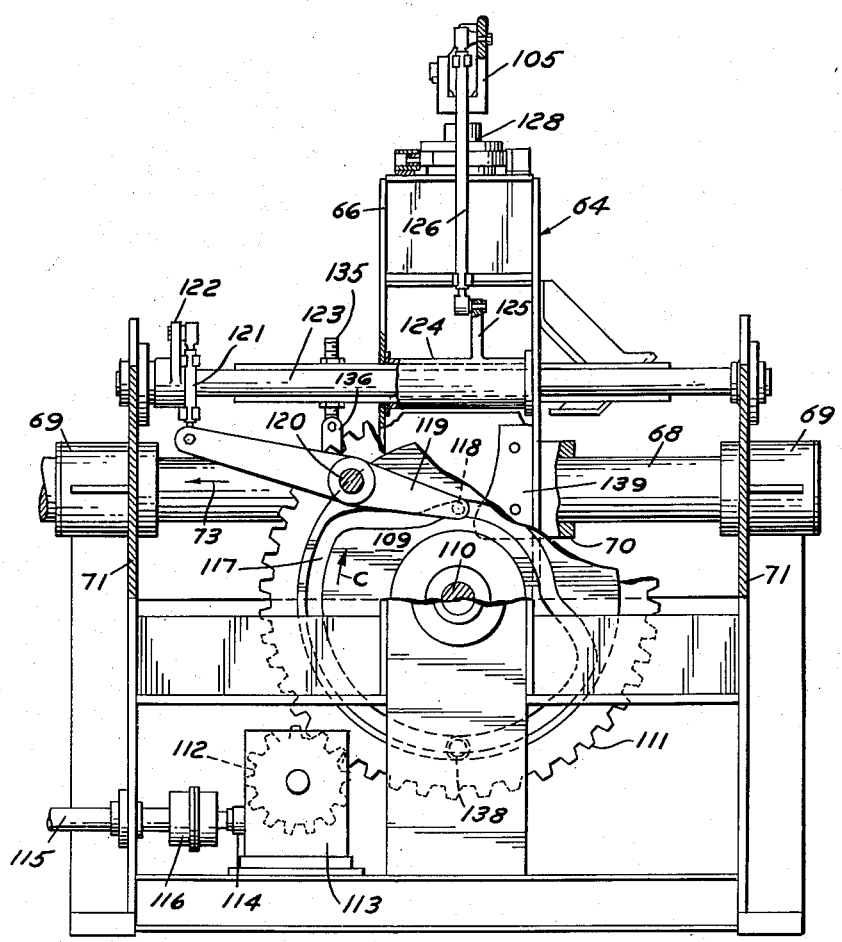

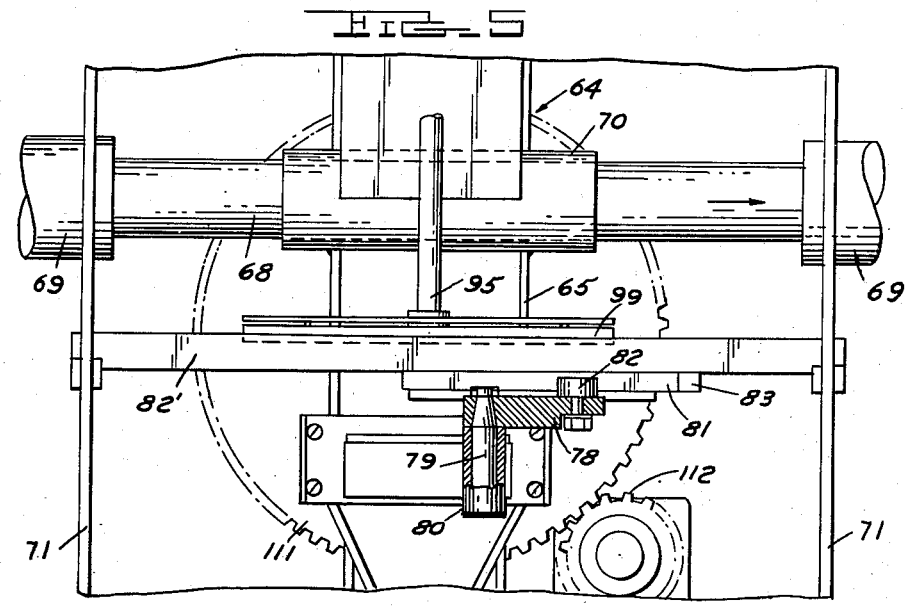
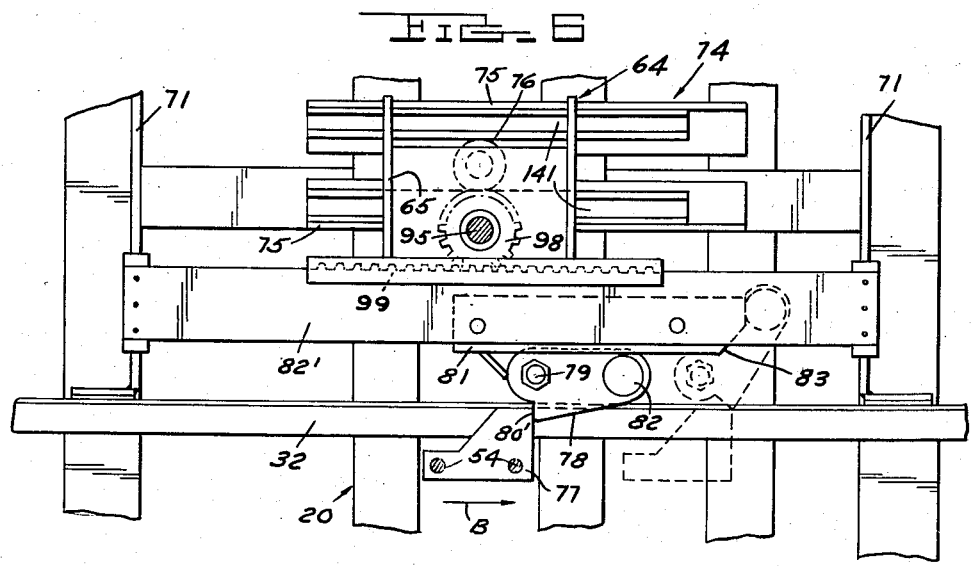

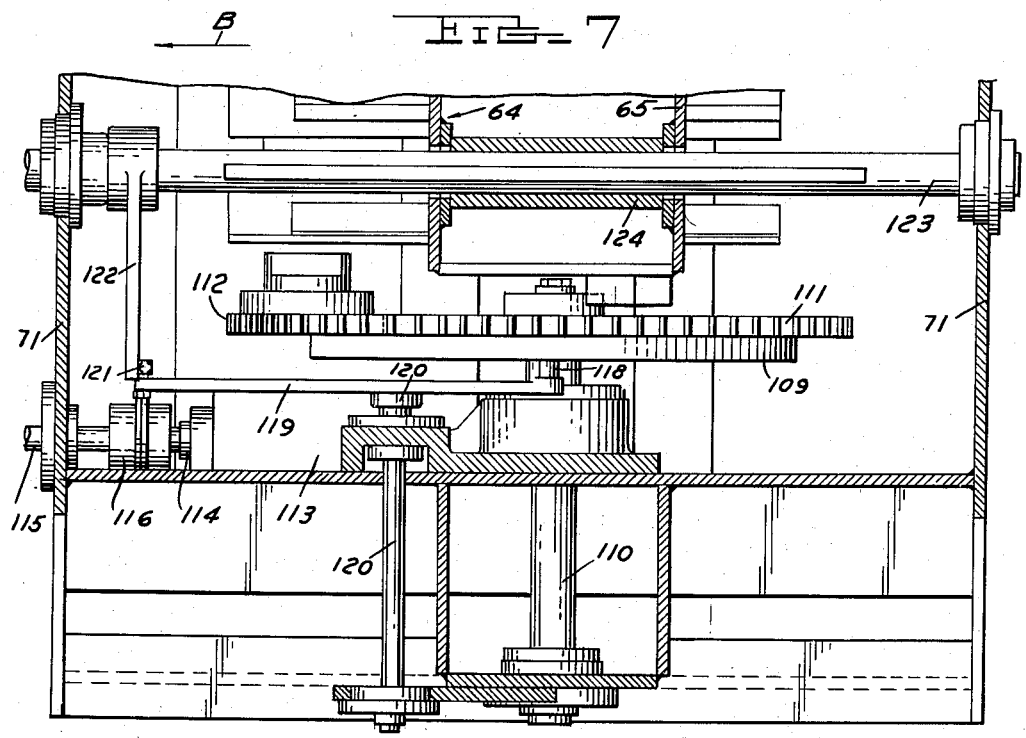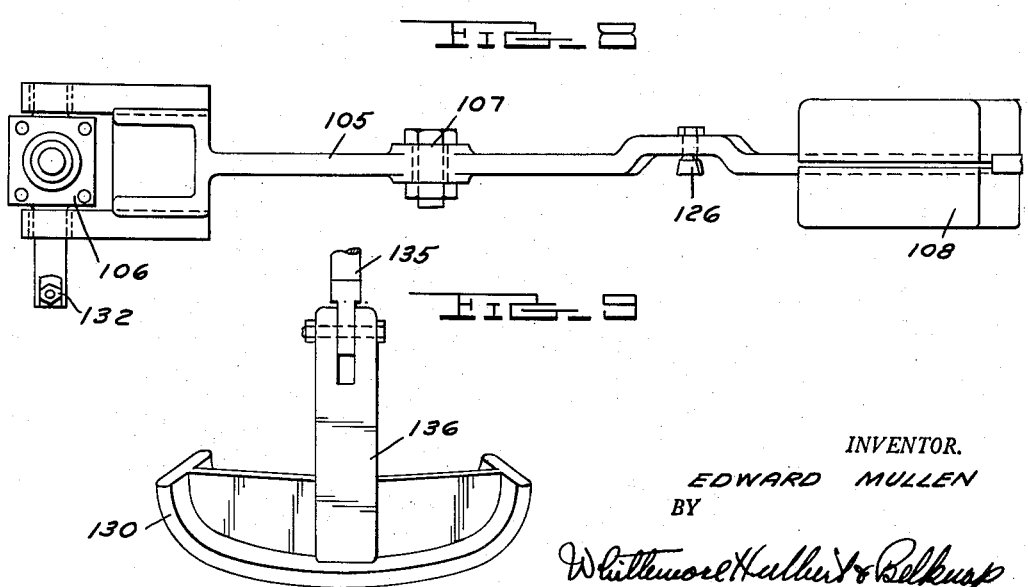

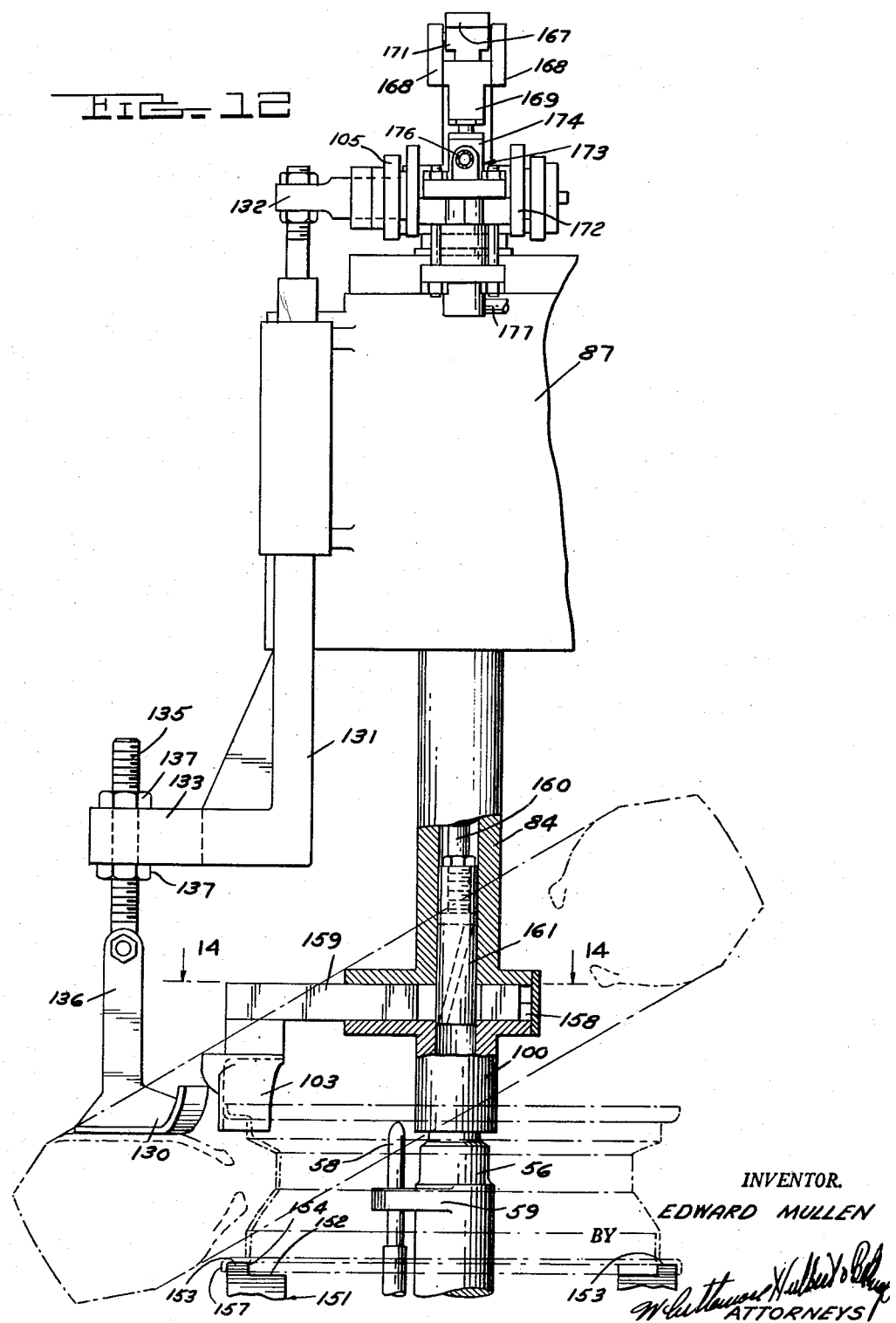

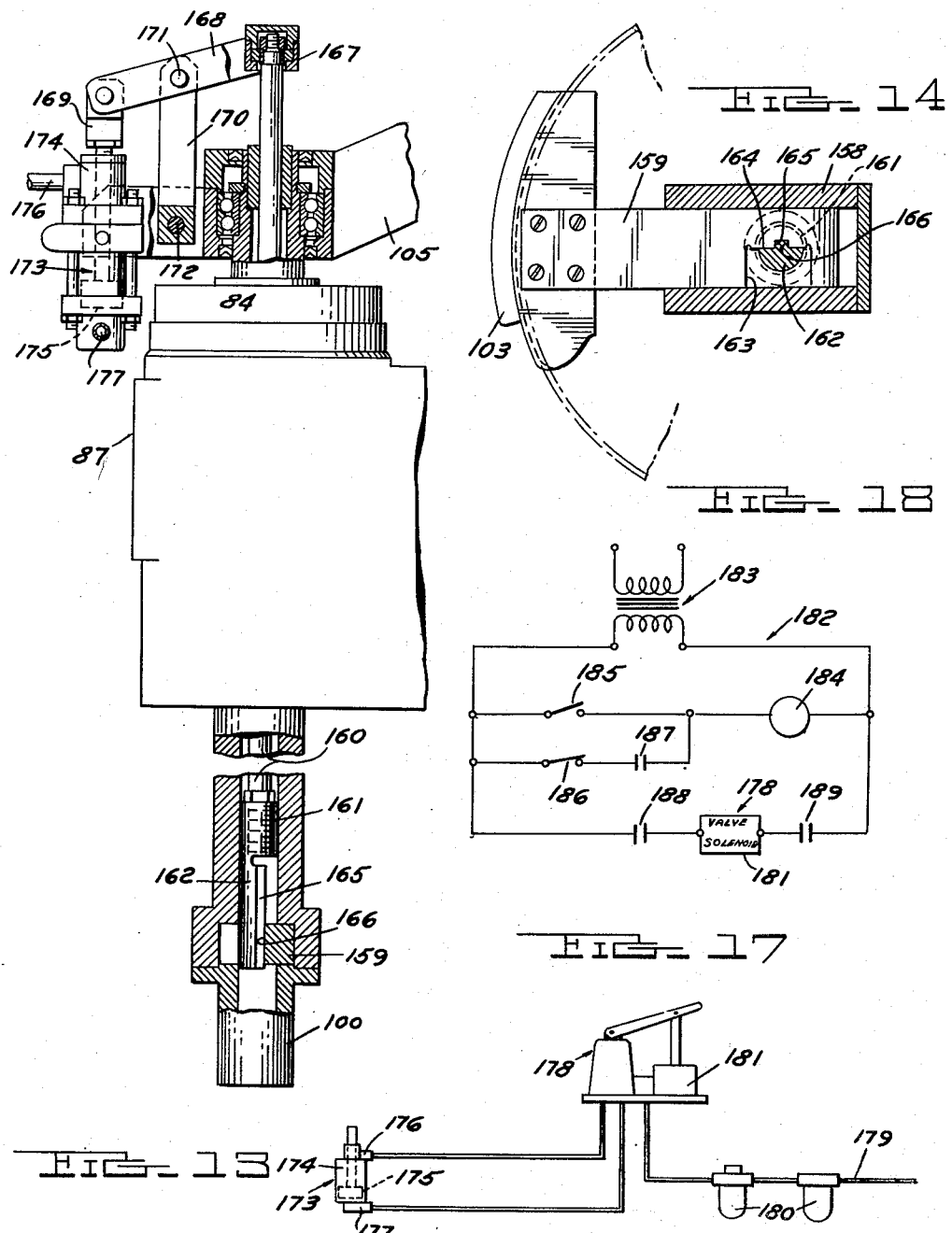

Dec. 1, 1953 E. MULLEN 2,661,053
AUTOMATICALLY ADJUSTING, POWER-OPERATED
TIRE AND RIM ASSEMBLING APPARATUS
Filed March 28, 1951 9 Sheets-Sheet 9
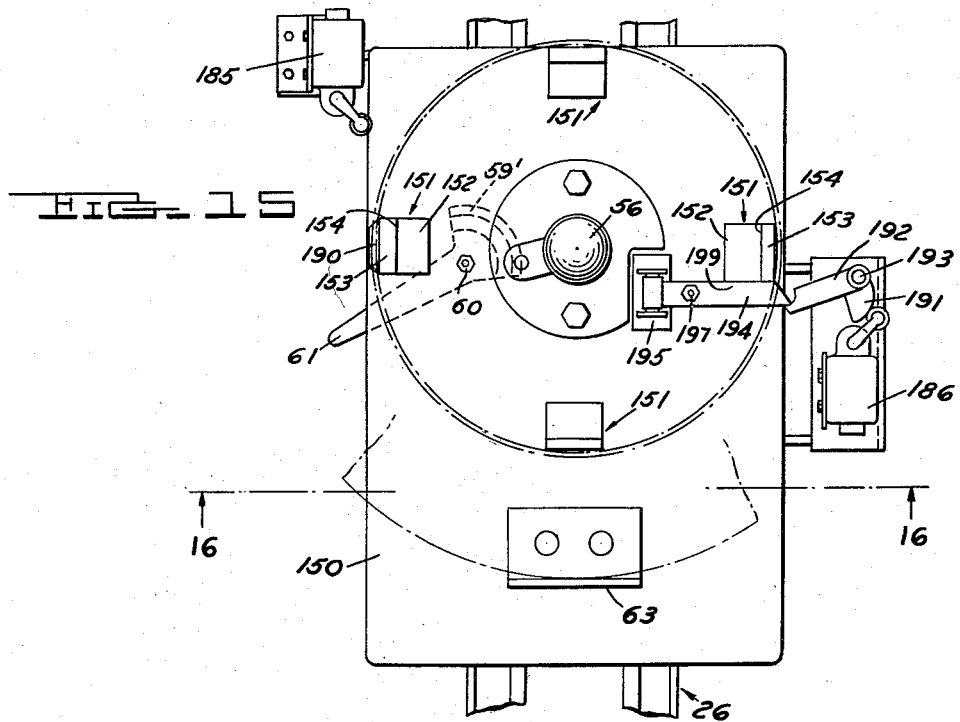
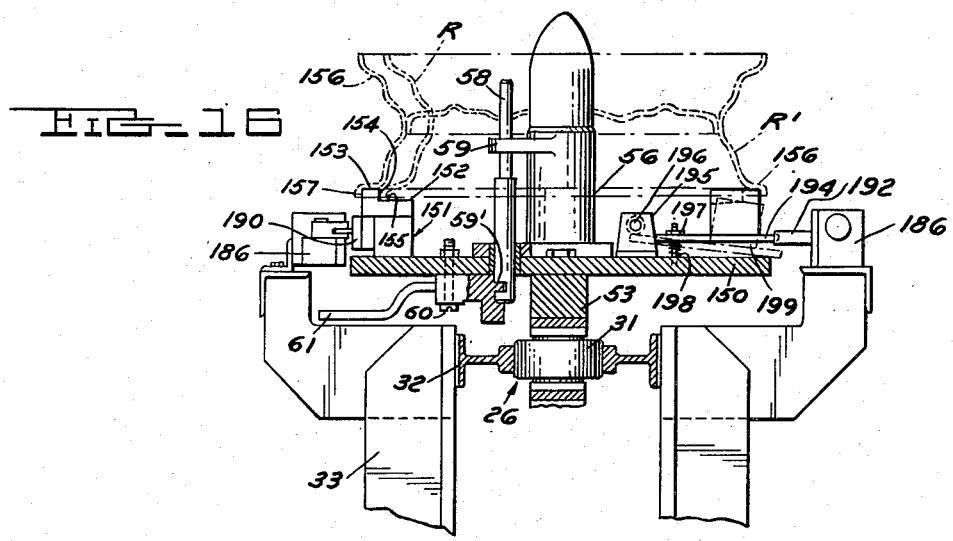
INVENTOR
EDWARD MULLEN
BY
Whittemore Hulbert & Belknap
ATTORNEYS

Patented Dec. 1, 1953

2,661,053

UNITED STATES PATENT OFFICE 2,661,053

AUTOMATICALLY ADJUSTING POWER-OPERATED TIRE AND RIM ASSEMBLING APPARATUS

Edward Mullen, Detroit, Mich., assignor to Mechanical Handling Systems, Inc., Detroit, Mich., a corporation of Michigan Application March 28, 1951, Serial No. 217,936

23 Claims. (Cl. 157—1.1)

This invention relates generally to work handling equipment and refers more particularly to improvements in apparatus for assembling pneumatic tires on vehicle wheels.

It is an object of this invention to provide an assembly device capable of being used in connection with a continuous conveyor for assembling pneumatic tires on vehicle wheels while the wheels and tires are advanced along a predetermined path of travel by the conveyor. In accordance with this invention the device is moved as a unit with the conveyor from a position termed a rest station herein during the time the wheel and tire registering with the device are assembled by the device. Upon completion of the assembly operation, and as the conveyor continues to advance, the device is returned to the rest station for registration with the next succeeding tire and wheel unit on the conveyor.

It is another object of this invention to provide an assembly device which is automatic in operation and is composed of a relatively few simple parts capable of being inexpensively manufactured, assembled and installed.

It is still another object of this invention to provide apparatus of the above general type having a relatively simple arrangement rendering it possible to assemble wheel rims and tires of different sizes.

The foregoing as well as other objects will be made more apparent as this description proceeds, especially when considered in connection with the accompanying drawings, wherein:

Figure 1 is a fragmentary top plan view of a part of the apparatus forming the subject matter of this invention;

Figure 2 is a fragmentary side elevational view of a part of the apparatus shown in Figure 1;

Figure 3 is a vertical sectional view taken substantially on the plane indicated by the line 3—3 of Figure 2;

Figure 4 is a sectional view taken substantially on the line 4—4 of Figure 3;

Figure 5 is a sectional view taken substantially on the line 5—5 of Figure 3;

Figure 6 is a sectional view taken on the line 6—6 of Figure 3;

Figure 7 is a sectional view taken on the line 7—7 of Figure 3;

Figure 8 is an elevational view looking in the direction of the arrow 8—8 in Figure 3;

Figure 9 is an elevational view looking in the direction of the arrow 9 in Figure 2;

Figure 10 is an elevational view looking in the direction of the arrows 10—10 in Figure 2;

Figure 11 is a semi-diagrammatic elevational view showing the relationship between the wheel and tire prior to the assembly operation;

Figure 12 is a fragmentary side elevational view partly in section of a modified form of assembly device;

Figure 13 is a fragmentary side elevational view partly in section of the construction shown in Figure 12;

Figure 14 is a sectional view taken on the line 14—14 of Figure 12;

Figure 15 is a plan view of the wheel and tire supporting table used in connection with the assembly device shown in Figure 12;

Figure 16 is a sectional view taken on the line 16—16 of Figure 15;

Figure 17 is a diagram of the fluid pressure control circuit for the assembly device shown in Figure 12; and Figure 18 is a diagram of the electrical control circuit.

The apparatus shown in Figures 1 to 11 inclusive of the drawings comprises generally a conveyor 20 and an assembly device 21. The conveyor 20 is continuously movable along a predetermined path of travel, and is equipped to advance vehicle wheels 22 with pneumatic tires 23 in operative relation to the wheel rims 24. The assembly device 21 is supported above the conveyor 20 in a position to successively register with the tire and wheel units as they are advanced by the conveyor 20. The broken line position of the assembly device shown in Figure 1 is termed herein a rest station and is designated by the numeral 25.

The purpose of the assembly device 21 is to force the tires 23 onto the wheel rims 24; and in the present instance, this is accomplished without interrupting advancement of the conveyor by moving the assembly device 21 as a unit with the conveyor 20 during the period of time required for the device 21 to secure the tire 23 on the rim 24 of the wheel 22 registering with the device. Upon completion of the tire assembling operation, the device 21 is returned to the rest station 25 for registration with the next succeeding tire and wheel unit on the conveyor 20.

Conveyor

The conveyor 20 comprises a pair of chains 26 and 27 spaced one above the other in a vertical plane. Both chains are identical in construction and each comprises vertically spaced links 28 having the adjacent ends pivotally connected together. In the present instance the adjacent ends of the links in each chain are pivotally connected by a common vertical pin 29, and the two chains are held in vertical spaced relationship by tubular spacers 30 respectively supported on the pins 29.

The conveyor 20 is guided along its preselected path of travel by rollers and guide rails 32. A pair of rollers 31 are respectively supported on opposite ends of the pins 29 between the links 28 of the top and bottom chains. The guide rails 32 are secured to upright frame members 33, and are respectively positioned at opposite sides of the path of travel of the rollers for engagement with the latter.

The conveyor 20 is vertically positioned by casters 34 respectively secured to the bottom chain 27 for pivotal movement about vertical axes. The rollers 35 of the casters are positioned to engage a track 36 in the form of a length of angle iron which extends along the desired path of travel of the conveyor.

The means for driving a conveyor 20 is indicated diagrammatically in Figure 1 of the drawings, wherein it will be noted that the numeral 37 designates a caterpillar type continuous chain supported in a horizontal plane intermediate the top and bottom chains 26 and 27 in a position to engage the spacers 30 on the conveyor chain 20. The opposite ends of the chain 37 are engaged by sprockets 38 and 39 respectively secured to shafts 40 and 41. The shafts 40 and 41 are suitably supported with their axes extending vertically, and a gear 42 is secured to the shaft 41. The gear 42 meshes with a gear 43 which is secured to the driven shaft 44 of a speed reducer 45.

The drive shaft 46 of the speed reducer has a sprocket 47 secured thereto, and this sprocket is connected by a chain 48 to the output shaft of a Reeves type transmission 49. The transmission 49 is driven by an electric motor 50 suitably supported on a part of the frame structure. In the present instance the motor 50 drives the caterpillar type chain 37 in the direction of the arrow "A" in Figure 1 with the result that the conveyor 20 is driven in the direction of the arrow "B" in Figures 1, 2, and 7.

*Work supporting table*

As shown particularly in Figures 1 to 3 inclusive, it will be noted that a plurality of work supporting tables 51 are secured to the top chain 26 of the conveyor in spaced relation to each other in the direction of the path of travel of the conveyor. The work supporting tables 51 are identical in construction; and accordingly, a description of one will suffice for all. In detail the table comprises a carrier plate 52 supported in a horizontal plane above the top chain 26 of the conveyor 20 and secured to one link 28 of the chain 26 through the medium of a spacer in the form of a block 53. In Figure 2 of the drawings, the carrier plate 52 and spacer 53 are shown as secured to the top of the chain 26 by studs 54. A mounting plate 55 is secured to the carrier plate 52 by the studs 54, and a centering stud 56 projects upwardly from the plate 55.

The centering stud 56 projects through the central opening in the body of the wheel 22 and locates the wheel in position on the plate 52. In the event it is desired to prevent rotation of the wheel 22 relative to the plate 52, a locating pin 58 may be provided. As shown particularly in Figure 3 of the drawings, the pin 58 extends vertically and is slidably supported in aligned openings formed in the plates 52 and 55. The upper end of the pin 58 is slidably supported in an opening formed in a lug 59 projecting laterally from one side of the pin 56, and in the uppermost position of the pin 56, projects through one of the bolt receiving openings provided in the body of the vehicle wheel 22. The portion of the pin 58 below the carrier plate 52 is formed with a slot which is engaged by an helically extending cam 59'. The cam 59' is rotatable about a pivot pin 60 secured to the carrier plate 52 with its axis extending vertically. The cam is manually rotated about the pin 60 by a lever 61 to raise the pin 58 and engage the same in one of the bolt openings of the vehicle wheel 22.

The cam 59' is automatically rotated in the opposite direction to lower the pin 58 out of the bolt opening in the wheel engaged thereby, and this is accomplished by a roller 62 secured to one of the uprights 33 of the frame structure. As shown in Figure 1 the roller 62 is supported in the path of travel of the levers 61 on the respective tables 51, and is positioned to trip the levers as the device 21 approaches the end of its travel with the conveyor 20, or in other words, after the device 21 assembles the tire 23 on the wheel rim 24.

The carrier plates 52 not only support the vehicle wheel 22, but in addition, support the tire 23 in relation to the vehicle wheel. In the present instance the tire is supported in the position thereof shown in Figure 11 of the drawings wherein the front side of the tire rests on the plate 52 with the rim engaging beads located within the confines of the wheel rim 24. The opposite or rear side of the tire, however, assumes a position spaced some distance above the wheel 22. The tire is located in this generally inclined position with respect to the wheel by a member 63 secured to the top of the plate 52 and extending upwardly from the plate in a position to engage the front side of the tire and prevent shifting movement of the tire relative to the wheel.

*Assembly device*

The assembly device 21 is normally located at the rest station 25 in a position to register with the wheel and tire units on the work supporting tables 51 as the latter are advanced by the conveyor. The device 21 has a frame structure 64 shown in Figure 3 of the drawings as having a part 65 and a housing 66. The part 65 is positioned at one side of the conveyor 20 and projects vertically to a position spaced substantially above the top of the conveyor 20. The housing 66 is secured to the upper end of the part 65 and overhangs the conveyor 20 in vertical spaced relation thereto.

The frame 64 is movable for a limited distance along the path of travel of the conveyor 20 and is guided throughout this movement by an assembly 67 shown best in Figure 2 of the drawings. The assembly 67 comprises a tube 68 and brackets 69. The tube 68 extends generally parallel to the path of travel of the conveyor 20 and is secured to a bushing 70, which in turn is fixed to the frame 65 as shown in Figures 3 and 5 of the drawings. The brackets 69 are spaced from each other in the direction of the axis of the tube 68, and are suitably secured to parts 71 of the fixed frame of the machine. Suitable bushings 72 are respectively secured in the bracket 69 and slidably engage the tube 68. Each end of the tube 68 is protected by a tubular shield 73, each of which is secured to one of the brackets 69 in a position to freely receive the adjacent end of the tube 68.

Referring again to Figure 3 of the drawings, it will be noted that the bottom of the frame part 65 is guided by a track 74 suitably secured to the base of the machine frame. The track 74 comprises a pair of angle irons extending in the direction of length of the conveyor 20 and having the upstanding flanges 75 spaced laterally from each other. Against the inside surface of each flange 75, a T rail 141 is fastened to receive a roller 76 therebetween. The roller 76 is supported on the frame 64 at the bottom of the part 65 for rotation about a vertical axis and opposite sides of the roller respectively engage the inner sides of the upstanding flanges 75. Thus, the frame 64 for the assembly device 21 is accurately guided for movement along the path of travel of the conveyor 20.

The assembly device 21 is moved in the direction of advancement of the conveyor 20 by the cooperation of lugs 77 on the conveyor, and a dog 78 on the frame 64 of the device. As shown in Figures 2, 3, 5 and 6 of the drawings, a lug 77 is secured to the underside of the conveyor chain 26 beneath each of the work supporting tables 51 by the fastener elements 54. Thus each work supporting table is provided with a lug 77, and the lugs successively engage the dog 78 on the device 21 during movement of the conveyor 20. The rear end of the dog 78 is pivoted on a pin 79 for swinging movement about a vertical axis, and the pin 79 is mounted on a bracket 80, which in turn is secured to the frame 64. It will be noted that the bracket 80 may be adjusted relative to the frame 64 in the direction of movement of the conveyor in order to accurately locate the dog for engagement by one of the lugs 77 at the proper time. As shown particularly in Figure 6, the dog is provided with a shoulder 80' at the rear end, and this shoulder extends in the path of travel of the lugs 77 for engagement thereby.

Swinging movement of the dog in an inward direction by the lugs 77 is prevented by a track 81 secured to the underside of a bar 82 which in turn is fixed at opposite ends to the stationary frame parts 71. The bar extends in the direction of advancement of the conveyor, and the outer edge of the track 81 is engaged by a roller 82 supported on the front or swinging end of the dog 78. The front end of the track 81 has an inwardly inclined cam surface 83 which engages the roller 82 and permits the front end of the dog 78 to swing laterally inwardly to the broken line position shown in Figure 6 of the drawings. When in this latter position the shoulder 80' is swung out of the path of travel of the adjacent lug 77 to permit continued advancement of the conveyor relative to the frame 64 of the device 21. The length of the track 83 is determined to provide the extent of forward travel of the device 21 required to complete the assembly operation of the tire and wheel rim on the adjacent work supporting table 51.

Referring again to Figure 3 of the drawings, it will be noted that the device 21 is also provided with a spindle 84 rotatably supported on the housing 66 with its axis extending vertically, and located to assume a position in alignment with the vehicle wheel centering pins 56 as the latter are successively moved by the conveyor to positions in registration with the assembly device 21. The upper end of the spindle 84 extends through a sleeve 85 and is provided with a splined connection with the sleeve 85 to permit vertical sliding movement of the spindle relative to the sleeve. The upper end of the sleeve 85 is journalled in suitable bearings 86 which in turn are secured in the upper end of a head 87. The head 87 is secured in any suitable manner to the housing 66, and as a consequence, moves as a unit with the frame 64. The lower end of the sleeve 85 is journalled in a bearing 88 suitably secured in the head 87 adjacent the bottom of the latter. It has been stated above that the sleeve 85 has a splined connection with the spindle 84. This is accomplished by a pair of keys 89 secured to the sleeve 85 at diametrically opposite sides of the spindle, in positions to engage longitudinally extending splines formed on the spindle. Thus it will be noted that the spindle 84 is slidably supported in the sleeve 85 in a manner such that rotation of the sleeve imparts a corresponding rotation to the spindle 84.

The sleeve 85 and spindle 84 are rotated in timed relation to movement of the conveyor 20 through suitable gearing. In detail, a gear 90 is secured to the lower end of the sleeve 85 below the head 87 in mesh with an intermediate gear 91. The intermediate gear 91 is secured to the lower end of a vertical shaft 92 which is journalled on the housing 66 by bearings 93. A driving gear 94 meshes with the intermediate gear 94 and is secured to a vertical shaft 95 adjacent the upper end thereof. The upper end of the shaft 95 is journalled in a bearing 96 carried by the housing 66 and the lower end of the shaft 95 is journalled in a bearing 97 on the frame part 65. The shaft 95 is rotated by a pinion 98 secured to the shaft 95 adjacent its lower end in a position to mesh with a rack 99 on the fixed frame of the machine.

As shown in Figures 5 and 6 of the drawings, the rack 99 is secured to the stationary bar 82 on the fixed frame parts 71. The rack 99 is positioned at the assembly station 25 and is of sufficient length to engage the pinion 98 throughout the extent of travel of the assembly device 21 with the conveyor 20. It will of course be understood that as the device 21 is moved with the conveyor 20 relative to the fixed frame parts 71, the spindle 84 is rotated in a clockwise direction, looking down.

The lower end of the spindle 84 has a counterbored fitting 100 secured thereto in a position to receive the upper end of the guide pin 56 on the registering work holding table 51. A suitable bearing 101 may be provided at the bottom of the fitting for engagement with the adjacent guide pin 56 in order to reduce friction to a minimum. The fitting 100 has a laterally extending arm 102, and a shoe 103 (Figures 2 and 10) is secured to the free end of the arm. The shoe 103 may be of any suitable construction; and is shown herein as having a formed cam face 104 positioned to engage the uppermost tire bead immediately adjacent the periphery of the wheel rim. The construction is such that when the spindle 84 is in its lowermost position, the shoe 103 presses against the tire bead at the top side of the tire and forces the bead into engagement with its seat on the wheel rim 24. Rotation of the shoe 103 with the spindle 84 relative to the tire forces the tire over the rim and causes the tire beads to engage their respective seats on the rim.

The spindle 84 is moved vertically toward and away from the work table 51 registering with the lower end of the spindle by the following mechanism. As shown in Figures 3 and 8 of the drawings, a lever 105 is pivoted at the outer end to a cap 106, which is journalled on the upper end of the spindle 84 above the head 87. The lever 105 is fulcrumed intermediate the ends on a pivot pin 107, and the inner end of the lever has a counterweight 108 adjustably secured thereto tending to swing the lever in a direction about the pin 107 to raise the spindle 84.

The lever 105 is swung in opposite directions about the pivot pin 107 to raise and lower the spindle 84 by a cam 109 shown in Figure 4 of the drawings. The cam 109 is secured to a shaft 110 suitably journalled on the machine frame and having a gear 111 secured thereto. The gear 111 meshes with a pinion 112 driven by a suitable speed reducer 113 having the power input shaft 114 coupled to a drive shaft 115 through the medium of a coupling 116. The shaft 115 is shown in Figure 1 of the drawings as coupled to the speed reducer 45 of the conveyor driving mechanism. The arrangement is such that the cam 109 is driven in timed relation to the movement of the conveyor 20, so that the spindle 84 is moved downwardly and upwardly at the proper intervals.

With the above in view, reference is again made to Figure 4 of the drawings, wherein it will be noted that the cam 109 is formed with a contoured groove 117 in one face, and this groove is designed to receive a follower in the form of a roller 118. The roller 118 is supported at one end of a lever 119 fulcrumed intermediate the ends on a fixed pivot pin 120 and having the opposite end pivoted to the lower end of a link 121. The upper end of the link 121 is pivoted to an arm 122 extending laterally from and secured to a shaft 123. The shaft 123 is journalled at opposite ends on the fixed parts 71 of the machine frame, and extends through a sleeve 124 secured to the frame 64 of the device 21. The sleeve 124 is splined on the shaft 123 to enable movement of the device 21 or frame 64 relative to the shaft 123. An arm 125 extends laterally from the sleeve 124 intermediate the ends thereof. As shown in Figures 3 and 4 of the drawings, the free end of the arm 125 is pivoted to the lower end of a link 126, and the upper end of this link is pivoted to the lever 105 at a point spaced inwardly from the fulcrum pin 107.

It follows from the above that rotation of the cam 109 in the direction of the arrow "C" on Figure 4 of the drawings successively moves the spindle 84 downwardly and upwardly relative to the registering work supporting table 51. The configuration of the cam groove 117 and the speed of rotation of the cam 109 in relation to the rate of conveyor travel is determined so that the spindle 84 is moved downwardly after a work holding table has been advanced to the rest station 25 of the device and is moved upwardly at the end of the forward travel of the device 21 just prior to disengagement of the dog 78 with the adjacent conveyor driving lug 77.

Attention is called at this time to the fact that the fulcrum pin 107 is mounted on the upper end of a rod 127 having the lower end connected to a piston not shown of an air cylinder 128. The air cylinder 128 is suitably pivotally supported on the housing 66 of the frame 64 in order to compensate for angular movement of the lever 105. Air under pressure is supplied to the air cylinder at opposite sides of the piston through the medium of a four-way valve diagrammatically illustrated by the numeral 129. With this construction the operator may manipulate the valve 129 to raise the spindle 84 in the event any of the parts become jammed during operation.

Downward movement of the spindle 84 to position the fitting 100 over the centering pin 56 on the registering work supporting table 51 not only engages the shoe 103 with the tire 23, but in addition, serves to clamp the front side of the tire 23 to the table 51. As shown in Figure 2 of the drawings, a clamping foot 130 is located at the front side of the spindle 84 in a position to engage the top wall of the tire 23 on the table 51 registering with the lower end of the spindle 84. The foot 130 is movable with the spindle 84 in directions toward and away from the registering work supporting table 51 by the lever 105 previously described as pivoted to the upper end of the spindle 84. In detail a slide 131 is mounted on the front side of the head 87 for vertical sliding movement relative to the head. The upper end of the slide 131 is connected to the cap 106 on the top of the spindle 84 by a projection 132 extending laterally from the front side of the cap. The lower end of the slide 131 is connected to the foot 130 so that the foot moves up and down as a unit with the spindle 84.

Referring again to Figure 2 of the drawings, an arm 133 projects forwardly from the slide 131 and is provided with an elongated slot 134 through which the upper end of a stud 135 projects. The lower end of the stud 135 is pivoted to the upper end of an arm 136 having the lower end secured to the clamping foot 130. Suitable clamping nuts 137 are threaded on the stud 135 at opposite sides of the arm 133 and serves to clamp the stud to the arm. The arrangement is such that the foot 130 may be adjusted in directions toward and away from the spindle 84 to enable locating the foot in the desired position relative to the tire 23 on the work supporting table 51 registering with the spindle.

After the device 21 is moved in a forward direction away from the rest station 25 by the conveyor 20, and the dog 78 on the device 21 is released from the adjacent conveyor lug 77, it is necessary to return the device to the rest station. With this in view, reference is again made to Figures 3 and 4 of the drawings, wherein the numeral 138 indicates a roller secured to one side of the gear 111 in a position to engage a cam 139 fixed to the frame 64 of the assembly device 21. The gear 111 is rotated in timed relation to the rate of travel of the conveyor 20, and the roller 138 engages the cam 139 after the dog 78 on the device 21 is released from the adjacent conveyor driving lug 77. Continued rotation of the gear 111 after the roller 138 engages the cam 139 moves the frame 64 or device 21 rearwardly toward the rest station 25. When the device 21 returns to the rest station 25, the cam 139 clears the roller 138 so that continued rotation of the gear 111 has no effect on the position of the assembly device 21. It will further be noted that the surface of the cam 139 engaged by the roller 138 is contoured to provide harmonic or substantially harmonic motion to the device 21, and thereby avoids unduly stressing the parts. Attention is also called to the fact that the roller 118 is engaged with the high side of the cam groove 117 before the roller 138 contacts the cam 139. Thus the spindle 84 and associated parts are elevated before the device 21 is returned to the rest station 25.

Operation

The conveyor 20 is driven continuously in the direction of the arrows B by the caterpillar chain 37 (Figure 1) to successively position the work supporting tables 51 at the assembly station 25. Before the tables 51 are advanced to the assembly station 25, a wheel 22 is positioned on each table in a manner such that the centering pins 56 on the respective tables project through the hub openings of the wheels 22 on the tables. In addition the levers 61 are manually operated to raise the locating pins 58 on the tables and project the upper ends of these pins through the bolt holes of the wheels on the respective tables. Also pneumatic tires 23 are positioned on the respective tables 51 in superimposed relation to the wheel rims 24. The tires 23 are merely placed over the wheels 22 so that the front sides of the tires rest on the respective tables 51 between the guide plates 63 and rim 24 of the wheel. As a result the rear sides of the tires assume positions spaced some distance above the adjacent sides of the wheels, as shown in Figure 11 of the drawings.

When the tables 51 with the wheels and tires thereon are advanced to the rest station 25, the spindle 84 and associated parts are in their elevated positions so as not to interfere with movement of the centering pins 56 to positions in axial alignment with the fitting 100 at the lower end of the spindle. As soon as the centering pin 56 on the table 51 at the rest station 25 registers with the fitting 100 at the lower end of the spindle 84, a lug 77 on the conveyor 20 engages the shoulder 80 on the dog 78 (Figure 6) and moves the dog forwardly along the track 81. The dog 78 is mounted on the device 21 so that the latter is advanced with the conveyor at the same rate as the conveyor. Also during initial advancement of the device 21 with the conveyor 20, the spindle 84 is rotated in a clockwise direction and is moved downwardly to telescope the fitting 100 with the upper end of the centering pin 56 on the table 51 registering with the device 21.

The spindle 84 is moved downwardly by the cam 109 (Figure 4) and is rotated by the rack 99 and pinion 98, shown in Figures 3 and 6 of the drawing. The pinion 98 is carried by the device 21 and the rack 99 is secured to the fixed frame parts 71 so that forward movement of the device 21 with the conveyor 20 rotates the spindle 84 in a clockwise direction.

Downward movement of the spindle 84 brings the shoe 103 and foot 130 into engagement with the top wall of the tire at the front side of the vehicle wheel 22, as shown in Figure 2 of the drawings. The foot 130 clamps the front side of the tire 23 securely against the table 51, and the shoe rotates around the wheel rim 24 in contact with the tire 23, moving the tire downwardly and forcing the tire beads over the tire retaining flanges on the rim. This operation is accomplished while the device 21 is being advanced with the conveyor 20.

As the device 21 approaches the end of its forward travel with the conveyor 20, the lever 61 on the registering table 51 engages the roller 62 (Figure 1) on the fixed frame and is rotated in a direction to withdraw the locating pin 58 (Figure 3) from the bolt hole in the vehicle wheel 22. Also the roller 82 (Figure 6) on the front end of the dog 78 engages the inclined surface 83 on the front end of the track 81 and permits the dog 78 to swing inwardly sufficiently to disengage the shoulder 80 on the dog 78 from the adjacent conveyor driving lug 77. Thus forward movement of the device 21 by the conveyor is discontinued.

Just before the dog 78 is released from the adjacent conveyor driving lug 77, the cam 109 operates to raise the spindle 84, shoe 103 and clamping foot 130. As a result the fitting 100 is disengaged from the centering pin 56 and the tire 23 is released from engagement by the shoe 103 and foot 130. Thus the conveyor 20 with the table 51 having the assembled tire and wheel thereon continues its forward travel relative to the device 21.

Upon completion of the foregoing operations, the roller 138 (Figures 3 and 4) engages the cam 139 and returns the device 21 to the rest station 25. During this return movement of the device 21, the rack 99 and pinion 98 coact to rotate the spindle 84 in a counterclockwise direction. As a result the shoe 103 is returned to its initial starting position for the next cycle of operation. Attention is called to the fact that the device 21 is returned to the rest station 25 before the next succeeding work supporting table 51 is advanced by the conveyor 20 to the rest station. The arrangement is such that the tire and wheel units on the tables 51 are successively assembled without interrupting advancement of the conveyor 20.

The embodiment of the invention shown in Figures 12 to 17 inclusive of the drawings differs principally from the construction shown in Figures 1 to 11 inclusive in that provision is made for moving the shoe 103 radially of the axis of rotation of the spindle 84 to engage the shoe 103 with tires of different diameter. Thus tires of appropriate diameter may be assembled on rims of different diameter.

With the above in view, reference is made to Figures 15 and 16 wherein the numeral 150 indicates a table similar to the table 51 in that it is fixed to the conveyor 20 for movement by the latter. However the table 150 has a plurality of circumferentially spaced rim supporting blocks 151 secured thereto in concentric relation to the wheel centering pin 56 on the table. Each block 151 has vertically spaced inner and outer rests 152 and 153 integrally connected by a vertical shoulder 154. The lowermost rests 152 are located in a common horizontal plane and provide a seat for a relatively small diameter rim R. As shown in Figure 16 of the drawings, the peripheral flange 155 on the rim R engages the rests 152 adjacent the vertical shoulders 154 in a manner such that the shoulders serve to center the rim R on the table. The top rests 153 are also located in a common horizontal plane and provide seats for engaging the tire retaining flanges 156 of a larger diameter rim R'. The peripheral flanges 157 on the rim R' engage the outer sides of the respective blocks 151 to center the rim R' on the table 150.

As shown in Figures 12 and 13, the lower end of the tubular spindle 84 is fashioned to coact with the fitting 100 to provide a guideway 158 which extends normal to the spindle 84 and slidably supports an arm 159. The outer end of the arm 159 supports the shoe 103 in a manner such that sliding movement of the arm 159 relative to the guideway 158 varies the position of the shoe 103 radially with respect to the vertical axis of the spindle 84. Thus the shoe 103 may be adjusted to engage the tires on either of the rims R and R'.

In the present instance the shoe 103 is adjusted by vertical displacement of a rod 160 slidably supported in the bore of the spindle 84. Referring again to Figures 12 and 13, the lower end of the rod 160 is secured to a plunger 161 movable across the guideway 158. The lower end of the plunger 161 is fashioned to provide a semicircular projection 162 which extends downwardly through a slot 163 in the inner end of the arm 159. The wall 164 of the projection 162 is flat and slidably engages the adjacent wall of the slot 163, as clearly shown in Figure 14 of the drawings. It will also be noted from Figure 14 that a cam in the form of a helically extending rib 165 is formed on the wall 164 of the plunger 161, and slidably engages in a correspondingly shaped groove 166 in the arm 159. The construction is such that downward movement of the rod 160 relative to the arm 159 moves the shoe 103 radially inwardly to a position wherein the shoe properly engages the tire associated with the rim R, and upward movement of the rod 160 shifts the shoe 103 radially outwardly to a position wherein it properly engages the tire associated with the rim R'.

The upper end of the rod 160 projects beyond the cap 106 at the top of the spindle 84, and a cap 167 is journalled on the upper end of the rod. A pair of arms 168 have the inner ends respectively pivotally connected to the cap 167 at opposite sides of the latter and the outer ends of the arms 168 are pivoted to a fitting 169. The arms 168 are also pivotally connected intermediate the ends to a support 170 by a pin 171, and the support is carried by a bracket 172 secured to the cap 106. Thus upward movement of the fitting 169 moves the rod 160 in a downward direction and downward movement of the fitting 169 moves the rod 160 in an upward direction.

The fitting 169 is operated by a fluid motor 173 comprising a vertical cylinder 174 and a piston 175 slidably supported in the cylinder. The opposite ends of the cylinder 174 have ports 176 and 177 respectively. These ports are alternately connected to a source of fluid supply and to a suitable exhaust (not shown) through the medium of a solenoid-operated four-way valve 178. In the present instance the fluid motor 174 is pneumatically operated and the air supply line is indicated in Figure 17 by the reference numeral 179. The air flowing from the source through the supply line 179 is lubricated by suitable devices 180 connected in the supply line 179 ahead of the valve 178. The solenoid-operated valve 178 may be any one of the various types available to the trade, and accordingly is not described in detail herein. It will suffice to point out that the valve is moved in one direction by a solenoid 181 and is moved in the opposite direction by suitable spring means not shown herein.

The electric circuit for controlling the operation of the solenoid 181 is shown diagrammatically in Figure 18 of the drawings, and is designated generally by the reference character 182. The control circuit 182 is connected to a source of electrical energy through the medium of a transformer 183; and comprises, in addition to the solenoid 181, a relay 184, a normally open limit switch 185 and a normally closed limit switch 186. The contacts of the relay 184 are indicated by the reference numerals 187, 188 and 189. Attention is called to the fact that the limit switch 186 and relay contacts 187 provide a shunt connection around the limit switch 185. The purpose of this arrangement will be more fully understood as the description proceeds.

Referring now to Figures 15 and 16, it will be noted that the limit switch 185 is supported at the left hand side of the path of travel of the table 150 in a position for operation by a projection 190 movable as a unit with the table 150. In the present instance the projection 190 is secured to the outer face of the adjacent rim supporting block 151. The limit switch 186 is suitably supported at the right hand side of the path of travel of the table 150, and is spaced in advance of the limit switch 185.

The limit switch 186 is operated by a cam 191 carried by the outer end of an arm 192. The outer end of the arm is pivoted as at 193, and the inner end of the arm is positioned for engagement by the outer end of an arm 194. The inner end of the arm 194 is pivotally supported on a bracket 195 by a pin 196 having its axis arranged to permit vertical swinging movement of the outer end of the arm. The bracket 195 is suitably secured to the table 150, so that the arm 194 is moved as a unit with the table.

As shown particularly in Figure 16 of the drawings, the arm 194 is normally held in engagement with a stop 197 by a suitable coil spring 198. The stop is located to coact with the coil spring 198 in positioning the outer end of the arm 194 in a common plane with the inner end of the arm 192, as shown in Figure 16 of the drawings. A trigger in the form of a flange 199 extends upwardly from the swinging end of the arm 194, and is positioned adjacent one side of one block 151 on the table 150. The upper edge of the flange 199 extends above the plane of the seats 152 on the blocks 151, and is engaged by the flange 155 on the rim R so that when the latter rim is in position on the table, the arm 194 is moved downwardly to the broken line position shown in Figure 16, where the outer end of the arm 194 is out of registration with the arm 192. However the flange 199 does not project above the plane of the seats 153 on the blocks 150, so that the normal position of the arm is not affected by the rim R'. It follows from the above that when the rim R is seated on the table 150, the limit switch 186 is not operated and remains in its closed position. However when a larger diameter rim R' is positioned on the table 150, the limit switch 186 is opened by the arm 194 as the table 150 is advanced.

Referring now to the operation of the shoe adjusting means, it will be noted that as the table 150 commences its forward travel, the limit switch 185 is closed by the projection 190 on the table 150. As a result the relay 184 is energized, and the contacts 187, 188 and 189 are closed. Since the normally closed limit switch 186 and the closed relay contacts 187 shunt the limit switch 185, it follows that the circuit remains closed after the limit switch 185 moves to its open position.

Closing of the circuit by the limit switch 185 energizes the solenoid 181 and operates the valve 178 to move the rod 160 in a downward direction. As a result the shoe 103 is moved inwardly to a position wherein it engages the tire on the relatively small diameter rim R. Assuming that the rim R is supported on the table 150, it will be noted that the arm 194 is in the broken line position thereof shown in Figure 16 wherein the outer end is spaced below the arm 192. Thus as the table 150 continues its advancement, the outer end of the arm 194 passes beneath the arm 192 and does not disturb the closed position of the limit switch 186.

However, if a larger diameter rim R' is seated on the table 150, the limit switch 186 is opened by the arm 194, and the circuit 182 is also opened to deenergize the solenoid 181. Accordingly the valve 178 is operated by the usual spring means to cause upward movement of the rod 160, and thereby move the shoe 103 radially outwardly to a position where it properly engages the tire on the larger diameter rim R'. It follows from the above that the circuit 182 is normally energized to maintain the shoe 103 in a position to properly engage the tire on the relatively small diameter rim R and that the shoe is reset to this position after each operation in connection with a larger diameter rim R'.

What I claim as my invention is:

1. Apparatus for assembling tires on wheel rims, comprising conveyor means movable along a predetermined path of travel, a rest station at one side of the conveyor means, a plurality of supports carried by the conveyor means in spaced relationship in the direction of movement of the conveyor means and successively registerable with the rest station, means for locating a wheel rim and tire in superimposed relation on each support, an assembly device supported at the rest station and having a part rotatably engageable with the tire on the support registering with the rest station, means for moving the assembly device in the direction of advancement of the conveyor means at substantially the same rate as the conveyor means and in timed relation to movement of a support into registration with the rest station, means for rotating the tire engaging part during movement of the device in the direction of advancement of the conveyor means to force the tire on the wheel rim, and means operating in timed relation to rotation of the tire engaging part for returning the device to the rest station.

2. The apparatus set forth in claim 1 wherein the means for rotating the tire engaging part comprises rack and pinion members, one of the members being mounted on the assembly device and the other member being fixed against movement with said device in a position to mesh with the said one member.

3. The apparatus set forth in claim 1 wherein the means for moving the assembly device in the direction of advancement of the conveyor means comprises a member carried by the device and extending into the path of travel of a plurality of members respectively carried by the conveyor means adjacent the supports in positions to successively engage the member carried by said device.

4. The apparatus set forth in claim 3 having cam means fixed against movement with the device and engageable with the member on the device to release the same from the adjacent member on the conveyor means upon completion of the operation of said tire engaging part to apply the tire on the wheel rim and prior to operation of the return means.

5. Apparatus for assembling tires on wheel rims, comprising a support, conveyor means for moving the support in one direction along a predetermined path of travel, means on the support for locating a wheel rim and tire in superimposed relation, a rest station at one side of the path of travel of the support, an assembly device supported at the rest station in a position to register with the tire on the support and movable along the path of travel of the support, said device having a part rotatable about the axis of the wheel rim and engageable with the tire, means for advancing the device as a unit with the support, means for rotating the tire engaging part during advancement of the assembly device to force the tire on the wheel rim, and means operating in timed relation to rotation of said part for returning the device to the rest station.

6. The apparatus set forth in claim 5 having means supporting the rotatable part for movement into and out of engagement with the tire on the support, and means for moving the part into engagement with the tire in timed relation to rotation of the part and for moving the part out of engagement with the tire prior to return movement of the device.

7. The apparatus set forth in claim 6 having means for clamping the tire at one side of the wheel rim against the support during rotation of the part around the tire, said clamping means comprising a holding element movable into and out of engagement with the tire as a unit with said part.

8. Apparatus for assembling tires on wheel rims, comprising conveyor means movable continuously in one direction, a support on the conveyor means, means on the support for locating a wheel rim and tire in superimposed relation, a rest station at one side of the path of travel of the support, an assembly device supported at the rest station in a position to register with the tire on the support and movable along the path of travel of the support, said device having a part rotatable about the axis of the wheel rim and engageable with the tire, means operated by the conveyor means and engageable with said device for advancing the device as a unit with the support, said last named means being releasable from the device after a predetermined distance of travel of the device, means operable during movement of the device with the support to rotate the tire engaging part and force the tire on the wheel rim, and means for moving the device relative to the conveyor means back to the rest station subsequent to releasing the device from the conveyor means.

9. The apparatus set forth in claim 8 wherein the means for rotating the part comprises rack and pinion members, one of the members carried by the device and the other member being fixed against movement at the rest station in a position to mesh with the first member and rotate the part in response to movement of the device in the direction of advancement of the conveyor means.

10. Apparatus for assembling tires on wheel rims, comprising a conveyor movable along a predetermined path of travel, a plurality of supports mounted on the conveyor and spaced from each other in the direction of advancement of the conveyor, means for positioning a wheel rim and tire on each support with the axis of the wheel rim extending vertically and with the tire extending over the top of the wheel rim, a rest station at one side of the conveyor means, an assembly device positioned at the rest station to successively register with the supports as they are advanced by the conveyor and movable along the path of travel of the conveyor, said device having a part rotatable about the axis of the wheel rim and engageable with the tire on the support registering with the device, means for advancing the device from the rest station as a unit with the registering support for a limited distance along the path of travel of the support, means for returning the device to the rest station at the end of the limited distance of travel of the device, and means for rotating said part in one direction as the device is advanced along said path of travel to force the tire on the wheel rim and for rotating the part in the reverse direction upon return movement of said device to the rest station.

11. The apparatus set forth in claim 10 having means supporting the tire engaging part for movement into and out of engagement with the tire on the registering support, means for moving the part into engagement with the tire in timed relation to rotation of said part in said one direction and for moving the part out of engagement with the tire prior to return movement of the device to said rest station.

12. The apparatus set forth in claim 10 wherein the means for rotating the part in opposite directions comprises rack and pinion members, one of the members carried by the device and the other member being fixed against movement at the rest station in a position to mesh with the said one member.

13. The apparatus set forth in claim 10 having nonrotatable means movable as a unit with said part toward and away from the adjacent tire to successively clamp the tire to and release the same from the registering support.

14. The apparatus set forth in claim 10 wherein the means for advancing the device with the conveyor comprises a plurality of lugs respectively mounted on the conveyor adjacent the supports, a dog pivoted on the device and having a shoulder normally positioned in the path of travel of the lugs, cam means fixed against movement with the device and engageable with the swinging end of the dog to hold the dog with its shoulder in the path of travel of the lugs, and means on the cam engageable with the swinging end of the dog at the end of the limited distance of advancement of the device to permit swinging movement of the dog in a direction to release the shoulder from the adjacent conveyor lug.

15. In apparatus for assembling tires on wheel rims, a table having means for alternately supporting rims of different diameter with their axes in the same relationship to the table, an assembly device registerable with the table, means for moving the table and assembly device forwardly along a predetermined path of travel, a part on the assembly device rotatable about the axis of the rim on the table as the latter is advanced and having a shoe spaced radially from the axis of rotation of said part for engagement with a tire positioned on a rim on the table to force the tire over the latter rim, means supporting the shoe for movement in directions radially of the axis of rotation of the part to register the shoe with tires positioned on the rims of different diameters and mechanism responsive to movement of the table and assembly device in a forward direction along said path of travel to move the shoe in one direction radially of the axis of rotation of the part a distance predetermined to locate the shoe in a position to engage the tire on the particular size rim supported on the table.

16. The apparatus defined in claim 15 having means operated by a rim of one diameter to render the mechanism inoperative to move said shoe radially with respect to axis of rotation of the part.

17. In apparatus for assembling tires on wheel rims, a table having means for alternately supporting rims of different diameter with their axes in the same relationship to the table, an assembly device registerble with the table, means for moving the table and assembly device forwardly along a predetermined path of travel, a part on the assembly device rotatable about the axis of the rim on the table as the latter is advanced and having a shoe spaced radially from the axis of rotation of said part for engagement with a tire positioned on a rim on the table to force the tire over the latter rim, means supporting the shoe for movement in directions radially of the axis of rotation of the part to register the shoe with tires postioned on the rims of different diameters, means responsive to movement of the table and assembly device in a forward direction along said path of travel to move the shoe in one direction radially of the axis of rotation of the part a distance predetermined to locate the shoe in a position to engage the tire on a rim of one diameter, said last named means including an arm projecting from one side of the table and a limit switch supported in the path of travel of the arm in a position to be operated by the arm upon initial forward movement of the assembly device and table.

18. The apparatus defined in claim 17 having means supporting the arm on the table for movement relative to the table out of registration with the limit switch, and means on the arm engageable by a second rim of different diameter to move said arm out of registration with the limit switch.

19. In apparatus for assembling tires on wheel rims, a table having means for alternately supporting rims of different diameter with their axes in the same relationship to the table, an assembly device registerable with the table, means for moving the table and assembly device forwardly along a predetermined path of travel, a part on the assembly device rotatable about the axis of the rim on the table as the latter is advanced and having a shoe spaced radially from the axis of rotation of said part for engagement with a tire positioned on a rim of given diameter on the table to force the associated tire over the latter rim, means supporting the shoe on said part for movement radially of the axis of the part to a second position wherein the shoe registers with the tire positioned on a rim of different diameter, means responsive to movement of the table and assembly device in a forward direction to successively move the shoe to the first and second positions aforesaid, said last-named means including an element engageable by a rim of said given diameter to render the shoe moving means inoperative to move said shoe to said second position.

20. Apparatus for assembling tires on wheel rims, comprising a support, conveyor means for moving the support in one direction along a predetermined path of travel, means on the support for locating a wheel rim and tire in superimposed relation, a rest station at one side of the path of travel of the support, an assembly device supported at the rest station in a position to register with the tire on the support and movable along the path of travel of the support, said device having a part rotatable about the axis of the wheel rim and engageable with the tire, means for advancing the device as a unit with the support, and means for rotating the tire engaging part during advancement of the assembly device to force the tire on the wheel rim.

21. Apparatus for assembling tires on wheel rims, comprising a support, conveyor means for moving the support in one direction along a predetermined path of travel, means on the support for locating a wheel rim and tire in superimposed relation, a rest station at one side of the path of travel of the support, an assembly device supported at the rest station in a position to register with the tire on the support and movable along the path of travel of the support, said device having a part engageable with the tire and movable along the top wall thereof, means for advancing the device as a unit with the support, means for moving the tire engaging part during advancement of the assembly device to force the tire on the wheel rim, and means operative in timed relation to the movement of said part for returning the device to the rest station.

22. Apparatus for assembling tires on wheel rims, comprising a support, conveyor means for moving the support in one direction along a predetermined path of travel, means on the support for locating a wheel rim and tire in superimposed relation, a rest station at one side of the path of travel of the support, an assembly device supported at the rest station in a position to register with the tire on the support and movable along the path of travel of the support, said device having a part engageable with the tire and movable along the top wall thereof, means for advancing the device as a unit with the support, and means for moving the tire engaging part during advancement of the assembly device to force the tire on the wheel rim.

23. In apparatus for assembling tires on wheel rims, an assembly device, a table registerable with the assembly device, a first rest on the table for supporting a rim of one diameter on the table, a second rest on the table for supporting a rim of a different diameter on said table with the axis of the second rim in the same relationship to the table as the axis of the first rim, a part on the assembly device rotatable about the axis of the rims supported on the table and having a shoe spaced radially from the axis of rotation of said part for engagement with a tire positioned on a rim of said one diameter seated on said first rest to force the associated tire over the latter rim, means supporting the shoe on said part for movement radially of the axis of rotation of the part to a second position wherein the shoe registers with the tire positioned on a rim of said different diameter seated on said second rest, means for moving the shoe to said second position, and control means for the shoe moving means, said control means being actuated by a rim of said one diameter seated on said first rest to render the shoe moving means inoperative.

EDWARD MULLEN.

References Cited in the file of this patent

UNITED STATES PATENTS

| Number | Name | Date |
|---|---|---|
| 582,195 | Gibbs | May 11, 1897 |
| 1,742,590 | Freivogel | Jan. 7, 1930 |
| 1,850,053 | Stevens | Mar. 15, 1932 |
| 2,488,376 | Clauser | Nov. 15, 1949 |
| 2,534,515 | Henderson | Dec. 19, 1950 |
| 2,556,024 | Bourdon et al. | June 5, 1951 |